United States Patent [19]

Marling

[11] 4,029,559

[45] June 14, 1977

[54] ION LASER ISOTOPE ENRICHMENT BY PHOTO-PREDISSOCIATION OF FORMALDEHYDE

[75] Inventor: John B. Marling, Livermore, Calif.

[73] Assignee: The United States of America as represented by the United States Energy Research and Development Administration, Washington, D.C.

[22] Filed: June 17, 1976

[21] Appl. No.: 697,000

[52] U.S. Cl. .......................................... 204/158 R
[51] Int. Cl.² ............................................ B01J 1/10
[58] Field of Search ................. 204/158 R, DIG. 11

[56] References Cited

OTHER PUBLICATIONS

Young, et al., Applied Phys. Lett. 21, 109–110, (1972).

Primary Examiner—Howard S. Williams
Attorney, Agent, or Firm—Dean E. Carlson; Roger S. Gaither; Irene S. Croft

[57] ABSTRACT

Enrichment of carbon, hydrogen and/or oxygen isotopes by means of isotopically selective photo-predissociation of formaldehyde is achieved by irradiation with a fixed frequency ion laser, specifically, a neon, cadmium, or xenon ion laser.

10 Claims, No Drawings

ION LASER ISOTOPE ENRICHMENT BY PHOTO-PREDISSOCIATION OF FORMALDEHYDE

BACKGROUND OF THE INVENTION

The invention described herein was made in the course of or under Energy Research and Development Administration Contract No. 7405-ENG-48 with University of California.

This invention relates to the selective isotopic enrichment of carbon, hydrogen and/or oxygen isotopes by ion laser formaldehyde photopredissociation.

Formaldehyde has an absorption spectra for which the upper state is predissociated. Thousands of discrete absorption lines exist in the range 300–355 nm (3000 A – 3550 A) and all lead to photodecomposition with production of carbon monoxide and hydrogen.

The advantages of using formaldehyde for isotope separation have been presented by Yeung and Moore (E. S. Yeung and C. B. Moore, "Isotopic Separation by Photo-predissociation", Appl. Phys. Lett. 21, 109–110, 1972), as a nearly ideal example of a molecule having isotopically well-resolved absorption lines for which the upper state is predissociated. Successful separation of $D_2$ from 1:1 mixture of $D_2CO$ and $H_2CO$ was achieved using frequency-doubled ruby laser light, yielding six-fold $D_2$ enrichment. Although this experiment neatly demonstrates the concept of laser photo-predissociation, it is not potentially applicable in practical, large scale systems for separation or rare isotopes.

Existence of a fortuitous coincidence between laser emission and a suitable resonant absorption line in formaldehyde would greatly simplify selective isotope enrichment of the rare isotopes available in formaldehyde.

SUMMARY OF THE INVENTION

According to the present invention, laser separation of isotopes of at least one of the elements carbon, hydrogen, and oxygen is achieved with high selectivity by means of photo-predissociation utilizing coincidences which have been found to exist between ion laser emission lines and suitable resonant absorption lines in formaldehyde. In particular, suitable coincidences have been found to exist with the emissions of neon, cadmium, and xenon lasers. It has also been found that by substituting $^{22}Ne$ for $^{20}Ne$ in a commercial neon laser, the neon-22 output is shifted to shorter wavelengths sufficiently to take advantage of an excellent absorption region in formaldehyde $^{13}C$ at about 3323.71 A.

It is, therefore, an object of this invention to separate isotopes by isotopically selective photo-predissociation of formaldehyde utilizing an ion laser, particularly a neon, cadmium or xenon ion laser.

A specific object of this invention is the enrichment of $^{13}C$ by photo-predissociation of formaldehyde using a $^{22}Ne$ ion laser at a wavelength of about 3323.71 A.

Other objects and advantages will become apparent from the following detailed description.

DETAILED DESCRIPTION OF THE INVENTION

The present invention provides a method for separating isotopes of carbon, hydrogen and/or oxygen which comprises irradiating gaseous formaldehyde with laser light provided by a source selected from the group consisting of a natural neon ion laser at a wavelength of about 3323.75 ± .025 A, selective for deuterium, $^{17}O$ and $^{18}O$; a neon-22 ion laser at a wavelength of about 3323.71 ± .01 A selective for $^{17}O$ and $^{13}C$; a cadmium ion laser at a wavelength of about 3250.3 A, selective for deuterium and $^{18}O$; and xenon ion laser at a wavelength of about 3454.26 A, selective for deuterium.

These molecules of the isotopic species having a resonant absorption line coinciding with the emission line of the particular ion laser used absorb the laser radiation and are thereby excited to a higher energy level, whereas those molecules containing other isotopes of the same element, particularly the naturally abundant isotopes $^1H$, $^{16}O$ and $^{12}C$, do not substantially absorb the laser radiation and therefore remain substantially unexcited. The excited molecules then dissociate to yield a dissociation product enriched in the corresponding isotope.

Dissociation of formaldehyde proceeds by the following mechanism:

$$H_2CO + h\nu \rightarrow H_2 + CO \qquad (1)$$

The isotopically enriched product, hydrogen or carbon monoxide according to the isotopic species being selectively excited, is readily separated from undissociated formaldehyde by standard chemical procedures such as cold trapping.

Photolysis of formaldehyde can also proceed by radical dissociation as follows:

$$H_2CO + h\nu \rightarrow H + HCO \qquad (2)$$

Radical dissociation is undesirable because of losses in selectivity due to isotopic scrambling. In some cases, a paramagnetic buffer gas, such as oxygen or nitric oxide can be added to the reaction system to suppress radical dissociation and, hence, reduce isotopic scrambling. Radical dissociation can be most effectively suppressed by exciting formaldehyde at wavelength longer than about 3300 A.

The present invention is illustrated by Examples 1–8 which are summarized in Table I. The following procedure was used in all cases. Monomeric formaldehyde gas samples were prepared by heating the polymer obtained commercially. Multiple distillation of the monomer at the temperature of a dry-ice and acetone slurry provided relatively pure gas samples free of water. Samples were then maintained at liquid nitrogen temperature until needed. A quartz or pyrex sample cell was filled with formaldehyde at total pressure of 4 torr (selected in order to avoid polymerization at room temperature). The sample was irradiated for a period of one-half hour with laser output power typically 20 mW, except as otherwise noted. The optical path length was about 2 meters. The irradiated gas was then passed through a liquid nitrogen cold trap in order to admit only the carbon monoxide and hydrogen photodissociation products into a mass spectrometer for analysis. Results are presented in Table I. A reference composition for the gas samples tested was obtained by completely photodissociating an identical gas sample prepared simultaneously using UV irradiation from a 100 watt high pressure mercury arc lamp. This induced isotopically nonselective photodissociation and provided the initial or reference composition of the gas samples tested, as indicated in Table I.

TABLE I

| Ex. | Laser | Wavelength, Å | Initial Content of Isotopic Species | Enrichment |
|---|---|---|---|---|
| 1[a] | CdII (untuned) | 3250.3 | .03% HDCO[b] | .5% HD (15-fold) |
| 2 | XeIII (tuned) | 3454.26 | .03% HDCO[b] | 1.7% HD (60-fold) |
|   |   |   | 1.3% HDCO | 44% HD (60-fold) |
| 3 | NeII (tuned) | 3323.77 | 1.9% $D_2CO$ | 77% $D_2$ (180-fold) |
| 4 | NeII (tuned) | 3323.73 | 4% $H_2C^{17}O$ | 13% $C^{17}O$ (3.5-fold) |
| 5 | $^{22}$NeII (tuned) | 3323.712 | 4.5% $H_2C^{17}O$ | 27% $C^{17}O$ (9-fold) |
| 6[a] | CdII (untuned) | 3250.3 | .021% $H_2C^{18}O$[b] | 1% $C^{18}O$ (5-fold) |
| 7 | NeII (tuned) | 3323.74 | .021% $H_2C^{18}O$[b] | 2% $C^{18}O$ (8.5-fold) |
|   |   |   | 13% $H_2C^{18}O$ | 55% $C^{18}O$ (8.5-fold) |
| 8 | $^{22}$NeII (tuned) | 3323.706 | 1.1% $H_2^{13}CO$ | 28% $^{13}CO$ (33-fold) |
|   |   |   | 29% $H_2^{13}CO$ | 80% $^{13}CO$ (9-fold) |

[a]Irradiation time was 4 hours and laser output power typically 0.5 mW.
[b]Natural isotopic abundance. Naturally occurring formaldehyde contains .03% HDCO, .021% $H_2C^{18}O$, 1.1% $H_2^{13}CO$, and .04% $H_2C^{17}O$.

The CdII (singly ionized), XeIII (doubly ionized, and NeII (singly ionized) ion lasers used in the above examples are commercially available lasers with output centered at about 3250.31 A, about 3454.25 A, and about 3323.75 A, respectively. An intracavity etalon was inserted in the neon and in the xenon lasers to permit tuning over about 15 gigahertz with 200 MHz linewidth. Tuning was accomplished by varing the temperature of the etalon.

The commercially available NeII laser utilizes natural neon, which is about 90% $^{20}$Ne and about 9% $^{22}$Ne. The $^{22}$NeII laser was obtained by substituting the isotope $^{22}$Ne for $^{20}$Ne in a commercial ion laser. It was found that by such substitution the output shifted 0.025 A to shorter wavelengths from normal output in natural neon to λ = 3373.72 A. This shift is just enough to take advantage of an excellent absorption in formaldehyde $^{13}$C at 3323.71 A by slightly tuning the $^{22}$NeII laser output. Tuning can be accomplished by the same method described above. The neon transitions at about 3323.7 A are the strongest known ultraviolet ion laser lines, with 1 watt output available at 350 amp/cm$^2$ bore current density. With formaldehyde at natural isotopic abundance (1.1% $H_2^{13}CO$), photolysis with the $^{22}$NeII laser yielded CO photoproducts with 27–30% $^{13}CO$, yielding a single step enrichment factor of 30–35, as illustrated by Example 8. For purposes of comparison, a run was made using natural neon output on a commercial laser. The best $^{13}C$ enrichment achievable was 3-fold on a weaker absorption line at 3323.75 A.

High enrichment factors are indispensable for economic separation of rare isotopes to permit efficient photon utilization. 20-Fold enrichment of $^{13}CO$ is the minimum economic requirement for a laser operating at 0.01% efficiency (typical of the strongest UV lines for an ion laser).

Consider, for example, a typical system for $^{13}C$ enrichment in accordance with the present invention. Gaseous paraformaldehyde at natural isotopic abundance and at a total pressure of about 50 torr is irradiated using a 1 watt $^{22}$NeII laser at about 3323.71 A with an optical path length of 100 meters. Photoproducts are separated by liquid nitrogen cold trapping. Considering 300 kg/year of formaldehyde source material and assuming 80% photon utilization, 2 kg/year of 28% enriched $^{13}CO$ may be produced in a single stage. For further enrichment, the photoproducts from the first stage (2 kg/year 28% $^{13}CO$ and 0.15 kg/year $H_2$) are reconverted to formaldehyde which is irradiated in a second stage using an identical laser operating at 0.25 watt, an optical path length of 100 meters and a pressure of 25 torr. Assuming 95% photon utilization, 0.67 kg/year of 80% enriched $^{13}CO$ may be obtained by this two-stage process. Alternatively, a 1.25 watt laser with a 20% beam splitter interposed can be used so that both beams can be obtained from a single laser. The addition of a suitable buffer gas, such as oxygen or nitric oxide, to suppress radical dissociation should permit two-step enrichment to reach 90–96% $^{13}CO$.

The total electrical cost of 1.25 watt output (20 kW input or 0.006% overall efficiency) is about $1,750/year at present rates. Total operating costs and capital amortization for a typical system is estimated at $11,000/year to produce 510 liters (STP) of 80% enriched $^{13}CO$, or $21.50/liter, or $45.80/gram of $^{13}C$. Laser efficiency may easily be increased to 0.01%, reducing the estimated cost to $28.60/gram of $^{13}C$. By comparison, the 1974 wholesale cost from Mount Laboratories (Monsanto Chemical Company) of 90%-enriched $^{13}C$ was $63.70gram of $^{13}C$. Thus, the present $^{13}C$ enrichment scheme using a $^{22}$NeII laser is economically viable with present technology.

A major advantage of the present invention is that the laser light source is locked to a frequency suitable for isotope separation by virtue of the coincidence between the ion laser emission and molecular absorption wavelengths. Hence, possible frequency instability or drift problems are avoided and automatic isotope separation ensues.

Although the invention has been hereinbefore described and illustrated with reference to specific examples, it will be appreciated that various modifications and changes may be made therein without departing from the true spirit and scope of the invention, and thus it is not intended to limit the invention except by the terms of the following claims.

What I claim is:

1. A method for separating isotopes of at least one element selected from carbon, hydrogen and oxygen by selective photo-predissociation of formaldehyde which comprises:

subjecting a gaseous formaldehyde isotope source material to laser radiation at a predetermined wavelength selected from the range of about 3323.75 ± .025 A, the range of about 3323.71 ± .01 A, about 3250.3 A, and about 3454.26 A which excites those molecules of formaldehyde containing a desired isotope of said element without substantially exciting those molecules of formaldehyde containing an undesired isotope of the same element, the excited molecules thereby dissociating to form a product enriched in the desired isotope without substantial dissociation of unexcited molecules;

providing said laser radiation by means of a neon ion laser when said predetermined wavelength is in the range of about 3323.75 ± .025 A, by means of a neon-22 ion laser when said predetermined wavelength is in the range of about 3323.71 ± .01 A, by means of a cadmium ion laser when said predetermined wavelength is about 3250.3 A, and by means of a xenon ion laser when said predetermined wavelength is about 3454.26 A; and separating the dissociation product enriched in the desired isotope from the reaction system.

2. The method according to claim 11 wherein the laser source is a neon ion laser and the predetermined wavelength is in the range of about 3323.75 ± .025 A.

3. The method according to claim 2 wherein the laser source is a neon ion laser, the predetermined wavelength is about 3323.77 A and the desired isotope is deuterium.

4. The method according to claim 2 wherein the laser source is a neon ion laser, the predetermined wavelength is about 3323.73 A and the desired isotope is $^{17}O$.

5. The method according to claim 2 wherein the laser source is a neon ion laser, the predetermined wavelength is about 3323.74 A and the desired isotope is $^{18}O$.

6. The method according to claim 11 wherein the laser source is a neon-22 ion laser and the predetermined wavelength is in the range of about 3323.71 ± .01 A.

7. The method according to claim 6 wherein the laser source is a neon-22 ion laser, the predetermined wavelength is about 3323.712 A and the desired isotope is $^{17}O$.

8. The method according to claim 6 wherein the laser source is a neon-22 ion laser, the predetermined wavelength is about 3323.706 A and the desired isotope is $^{13}C$.

9. The method according to claim 11 wherein the laser source is a cadmium ion laser, the predetermined wavelength is about 3250.3 A and the desired isotope is selected from $^{18}O$ and deuterium.

10. The method according to claim 11 wherein the laser source is a xenon ion laser, the predetermined wavelength is about 3454.26 A and the desired isotope is deuterium.

* * * * *